United States Patent
Malladi (10) Patent No.: US 12,056,388 B2
(45) Date of Patent: *Aug. 6, 2024

(54) ADJUSTABLE FUNCTION-IN-MEMORY COMPUTATION SYSTEM

(71) Applicant: Samsung Electronics Co., Ltd., Suwon-si (KR)

(72) Inventor: Krishna T. Malladi, San Jose, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/898,207

(22) Filed: Aug. 29, 2022

(65) Prior Publication Data

US 2022/0413750 A1 Dec. 29, 2022

Related U.S. Application Data

(63) Continuation of application No. 16/914,151, filed on Jun. 26, 2020, now Pat. No. 11,429,310.

(60) Provisional application No. 62/986,326, filed on Mar. 6, 2020.

(51) Int. Cl.
*G06F 3/06* (2006.01)

(52) U.S. Cl.
CPC .......... *G06F 3/0655* (2013.01); *G06F 3/0604* (2013.01); *G06F 3/0673* (2013.01)

(58) Field of Classification Search
CPC .... G06F 3/0655; G06F 3/0604; G06F 3/0673; G06F 15/7821; G06F 7/544; G11C 16/34
See application file for complete search history.

(56) References Cited

U.S. PATENT DOCUMENTS

| 5,179,702 A | 1/1993 | Spix et al. |
| 8,291,400 B1 | 10/2012 | Lee et al. |
| 8,949,806 B1 | 2/2015 | Lee et al. |

(Continued)

FOREIGN PATENT DOCUMENTS

| CN | 110658984 A | 1/2020 |
| CN | 110709827 A | 1/2020 |

OTHER PUBLICATIONS

Taiwanese Search Report for TW Application No. 110100007 dated May 1, 2024, 1 page.

*Primary Examiner* — Zhuo H Li (74) *Attorney, Agent, or Firm* — Lewis Roca Rothgerber Christie LLP (57) ABSTRACT

A method for in-memory computing. In some embodiments, the method includes: executing, by a first function-in-memory circuit, a first instruction, to produce, as a result, a first value, wherein a first computing task includes a second computing task and a third computing task, the second computing task including the first instruction; storing, by the first function-in-memory circuit, the first value in a first buffer; reading, by a second function-in-memory circuit, the first value from the first buffer; and executing, by a second function-in-memory circuit, a second instruction, the second instruction using the first value as an argument, the third computing task including the second instruction, wherein: the storing, by the first function-in-memory circuit, of the first value in the first buffer includes directly storing the first value in the first buffer.

20 Claims, 10 Drawing Sheets

(56) References Cited

U.S. PATENT DOCUMENTS

| | | | |
|---|---|---|---|
| 9,436,447 B2 | 9/2016 | Kong et al. | |
| 9,489,176 B2 | 11/2016 | Haugen | |
| 9,542,231 B2 | 1/2017 | Khan et al. | |
| 10,387,160 B2 | 8/2019 | Surti et al. | |
| 10,481,817 B2 | 11/2019 | Doshi et al. | |
| 10,942,927 B2 | 3/2021 | Sonst | |
| 11,100,193 B2 | 8/2021 | Gu et al. | |
| 11,429,310 B2* | 8/2022 | Malladi | G06F 3/0655 |
| 11,467,834 B2* | 10/2022 | Malladi | G06F 12/0831 |
| 2005/0125477 A1 | 6/2005 | Genov et al. | |
| 2010/0274972 A1 | 10/2010 | Babayan et al. | |
| 2019/0332315 A1 | 10/2019 | Oravivattanakul et al. | |
| 2021/0224185 A1 | 7/2021 | Zhou et al. | |
| 2021/0247978 A1* | 8/2021 | Malladi | G06F 9/30036 |
| 2021/0271597 A1 | 9/2021 | Verma et al. | |
| 2022/0107803 A1* | 4/2022 | Ro | G06F 15/7821 |
| 2023/0069786 A1* | 3/2023 | Malladi | G06F 13/42 |

* cited by examiner

| ID | operation | Description |
|---|---|---|
| 0 | Rop = GIO | Column read data stored in Rop |
| 1 | Rop = WIO | Column write data stored in Rop |
| 2 | Rop = Rz | Copy ALU output Rz to Rop |
| 3 | GIO = Rz | Write back into Bank |
| 4 | RIO = GIO | Normal Read to DQ output |
| 5 | RIO = Rz | Drive Rz to DQ output |
| 6 | Rz = Rop (op) GIO | Operation with Rop and data from bank |
| 7 | Rz = Rop (op) WIO | Operation with Rop and broadcast data |
| 8 | Rz = WIO (op) GIO | Operation with broadcast data and bank |
| 9 | GIO = WIO | Normal Write from DQ Input |

ADJUSTABLE FUNCTION-IN-MEMORY COMPUTATION SYSTEM

CROSS-REFERENCE TO RELATED APPLICATION(S)

The present application is a continuation application of U.S. application Ser. No. 16/914,151, filed Jun. 26, 2020, which claims priority to and the benefit of U.S. Provisional Application No. 62/986,326, filed Mar. 6, 2020, entitled "ADAPTIVE LAYOUT TARGETING IN-MEMORY OPERATIONS", the entire contents of all of which are incorporated by reference herein.

FIELD

One or more aspects of embodiments according to the present disclosure relate to data processing, and more particularly to adjustable in-memory computation.

BACKGROUND

This background section is included only for setting context and is not intended to limit the scope of the invention, nor to constitute any admission of prior art. In-memory computation (or "in-memory compute") may be employed to reduce performance degradation due to memory access bottlenecks. Using in-memory computation effectively, however, may involve efficiently passing intermediate results between function-in-memory circuits, and may involve using function-in-memory circuits specially adapted to the computing tasks to be performed.

Thus, there is a need for an improved system and method for in-memory computation.

SUMMARY

In some embodiments, the efficiency with which function-in-memory circuits perform computations having multiple stages may be improved using a producer-consumer model, which may be used, for example, if a product of three matrices is to be calculated, to allow the calculation of the overall product to begin before the entire product of the first two factors has been completed. function-in-memoryfunction-in-memoryfunction-in-memoryfunction-in-memoryfunction-in-memoryfunction-in-memoryfunction-in-memory Different approaches to performing certain calculations may be advantageous depending on the circumstances. In some embodiments different "islands" in memory may contain function-in-memory circuits with different capabilities, and a scheduler may cause different computing tasks to be delegated, by a host processing circuit connected to the islands, to respective islands depending on the nature of the computing tasks and on the capabilities of the function-in-memory circuits in each island.

According to an embodiment of the present invention, there is provided a method for in-memory computing, the method including: executing, by a first function-in-memory circuit, a first instruction, to produce, as a result, a first value, wherein a first computing task includes a second computing task and a third computing task, the second computing task including the first instruction; storing, by the first function-in-memory circuit, the first value in a first buffer; reading, by a second function-in-memory circuit, the first value from the first buffer; and executing, by a second function-in-memory circuit, a second instruction, the second instruction using the first value as an argument, the third computing task including the second instruction, wherein: the storing, by the first function-in-memory circuit, of the first value in the first buffer includes directly storing the first value in the first buffer, the reading, by the second function-in-memory circuit, of the first value from the first buffer includes directly reading the first value from the first buffer, the first function-in-memory circuit is in a first quantity of memory; the second function-in-memory circuit is in the first quantity of memory; and the first buffer is in the first quantity of memory.

In some embodiments, the method further includes, adjusting, by the first function-in-memory circuit, a pointer, the pointer identifying a boundary of a first portion of the first buffer in the first quantity of memory, the adjusting including moving the boundary, wherein the moving of the boundary has the effect of causing the first value to become included within the first portion.

In some embodiments, the method further includes: executing, by the first function-in-memory circuit, a third instruction, to produce, as a result, a second value, the second computing task including the third instruction; and executing, by the second function-in-memory circuit, a fourth instruction, the fourth instruction using the second value as an argument, the third computing task including the fourth instruction.

In some embodiments: the first computing task includes computing a product of a first matrix, a second matrix, and a third matrix; the second computing task includes computing a product of the first matrix and the second matrix, to form a first product matrix; and the third computing task includes computing a product of the first product matrix and the third matrix.

In some embodiments, the method further includes executing, by a third function-in-memory circuit, a third instruction, wherein: a fourth computing task includes the third instruction, the first function-in-memory circuit is in a first quantity of memory, the third function-in-memory circuit is in a second quantity of memory, and the third function-in-memory circuit has capabilities different from those of the first function-in-memory circuit.

In some embodiments, the fourth computing task includes: computing a product of a first matrix stored in the second quantity of memory and a second matrix stored in the second quantity of memory; and computing a product of a third matrix and a fourth matrix, leaving an order of storage of elements of the first matrix stored and of the second matrix unchanged, the third matrix being a transpose of the first matrix, or the fourth matrix being a transpose of the second matrix.

In some embodiments: the first computing task includes computing a product of a fifth matrix, a sixth matrix, and a seventh matrix; the second computing task includes computing a product of the fifth matrix and the sixth matrix, to form a first product matrix; and the third computing task includes computing a product of the first product matrix and the seventh matrix.

In some embodiments, the first quantity of memory is substantially isolated from the second quantity of memory.

In some embodiments, the computing of the product of the fifth matrix and the sixth matrix includes computing a product of a submatrix of the fifth matrix with a submatrix of the sixth matrix.

In some embodiments, the computing of the product of the fifth matrix and the sixth matrix includes computing a dot product of a row of the first matrix with a column of the second matrix.

In some embodiments, the computing of the product of the fifth matrix and the sixth matrix includes computing an outer product of a column of the first matrix with a row of the second matrix.

In some embodiments, the second computing task includes computing a function selected from the group consisting of sigmoid functions, rectifier linear unit functions, hyperbolic tangent functions, and combinations thereof.

In some embodiments, the third computing task includes computing a product of a fifth matrix and a sixth matrix, a result of the computing of the function being an element of the fifth matrix.

According to an embodiment of the present invention, there is provided a system for computing, the system including: a host processing circuit; and a first quantity of memory including a first function-in-memory circuit, a second function-in-memory circuit, and a first buffer, the host processing circuit being configured to program the first function-in-memory circuit and the second function-in-memory circuit, the programming causing: the first function-in-memory circuit: to execute a first instruction, to produce, as a result, a first value, wherein a first computing task includes a second computing task and a third computing task, the second computing task including the first instruction; and to store the first value in the first buffer; and the first function-in-memory circuit: to read the first value from the first buffer; and to execute a second instruction, the second instruction using the first value as an argument, the third computing task including the second instruction, wherein: the storing, by the first function-in-memory circuit, of the first value in the first buffer includes directly storing the first value in the first buffer, the reading, by the second function-in-memory circuit, of the first value from the first buffer includes directly reading the first value from the first buffer.

In some embodiments, the programming further causes the first function-in-memory circuit to adjust a pointer, the pointer identifying a boundary of a first portion of the first buffer in the first quantity of memory, the adjusting including moving the boundary, wherein the moving of the boundary has the effect of causing the first value to become included within the first portion.

In some embodiments, the programming further causes: the first function-in-memory circuit to execute, after the executing of the second instruction, a third instruction, to produce, as a result, a second value, the second computing task including the third instruction; and the second function-in-memory circuit to execute, after the executing of the third instruction, a fourth instruction, the fourth instruction using the second value as an argument, the third computing task including the fourth instruction.

In some embodiments: the first computing task includes computing a product of a first matrix, a second matrix, and a third matrix; the second computing task includes computing a product of the first matrix and the second matrix, to form a first product matrix; and the third computing task includes computing a product of the first product matrix and the third matrix.

In some embodiments, the host processing circuit is further configured to program a third function-in-memory circuit, the programming of the third function-in-memory circuit causing the third function-in-memory circuit to execute a third instruction, wherein: a fourth computing task includes the third instruction, the third function-in-memory circuit is in a second quantity of memory, and the third function-in-memory circuit has capabilities different from those of the first function-in-memory circuit.

In some embodiments, the fourth computing task includes: computing a product of a first matrix stored in the second quantity of memory and a second matrix stored in the second quantity of memory; and computing a product of a third matrix and a fourth matrix, leaving an order of storage of elements of the first matrix stored and of the second matrix unchanged, the third matrix being a transpose of the first matrix, or the fourth matrix being a transpose of the second matrix.

According to an embodiment of the present invention, there is provided a system for computing, the system including: means for processing; and a first quantity of memory including a first function-in-memory circuit, a second function-in-memory circuit, and a first buffer, the means for processing being configured to program the first function-in-memory circuit and the second function-in-memory circuit, the programming causing: the first function-in-memory circuit: to execute a first instruction, to produce, as a result, a first value, wherein a first computing task includes a second computing task and a third computing task, the second computing task including the first instruction; and to store the first value in the first buffer; and the first function-in-memory circuit: to read the first value from the first buffer; and to execute a second instruction, the second instruction using the first value as an argument, the third computing task including the second instruction, wherein: the storing, by the first function-in-memory circuit, of the first value in the first buffer includes directly storing the first value in the first buffer, the reading, by the second function-in-memory circuit, of the first value from the first buffer includes directly reading the first value from the first buffer.

BRIEF DESCRIPTION OF THE DRAWINGS

It will be understood that the drawings show only examples and that other embodiments, not explicitly illustrated, may also be constructed. These and other features and advantages of the present disclosure will be appreciated and understood with reference to the specification, claims, and appended drawings wherein:

DETAILED DESCRIPTION

The detailed description set forth below in connection with the appended drawings is intended as a description of exemplary embodiments of an adaptable function-in-memory system provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

In some embodiments, the efficiency with which function-in-memory circuits (FIMs) perform computations having multiple stages may be improved using a producer-consumer model. In general, a producer consumer model may be employed when there is an asynchrony between the data sources and sinks. The producer keeps pushing partially ready inputs without waiting for consumer acknowledgement and consumer starts processing whatever is in the queue. The queues have start and end pointers to keep track of valid data. Benefits include better latency and avoiding the need to block for fully ready inputs (as long as they can be independently processed). Such a model may be used, for example, if a product of three matrices is to be calculated (or "computed"). A first set of one or more function-in-memory circuits may calculate the product of the first matrix of the three matrices and the second matrix of the three matrices to form a first product matrix, and a second set of one or more function-in-memory circuits may calculate the product of the first product matrix and the third matrix of the three matrices. The elements of the first product matrix may, in some embodiments, be calculated one at a time. As used herein, the terms "function-in-memory", "in-memory compute" and "in-memory computation" are used interchangeably.

The use of a producer-consumer model may make it unnecessary to complete the calculation of first product matrix before beginning the calculation of the product of the first product matrix and the third matrix of the three matrices. Instead of waiting until all of the elements of the first product matrix have been calculated, the first set of one or more function-in-memory circuits may make the elements of the first product matrix available to the second set of one or more function-in-memory circuits as they are calculated. The second set of one or more function-in-memory circuits may then proceed with portions of the calculation of the product of the first product matrix and the third matrix of the three matrices as enough data become available for each such portion. For example, if the second set of one or more function-in-memory circuits calculates the product of the first product matrix and the third matrix as a plurality of dot products of rows of the first product matrix and columns of the third matrix, then the second set of one or more function-in-memory circuits may begin using each row of the first product matrix as it becomes available.

Different approaches to performing certain calculations may be advantageous depending on the circumstances. For example, a matrix product of a first matrix and a second matrix may be calculated as a set of dot products of rows of the first matrix and columns of the second matrix. Such an approach may require relatively little register space, as each such dot product results in a single number. Alternatively, the matrix product may be calculated by forming products of submatrices of the first matrix with submatrices of the second matrix. Such an approach may require more register space, but it may have the advantage that calculating other products, such as the product of the transpose of either matrix with the other matrix may be efficiently performed without reordering the data in memory.

In some circumstances, there are multiple options for performing matrix multiplication based on tradeoffs between data locality, available buffer space and the layout of input matrices in memory (e.g., row major or column major). In some embodiments, the system re-assesses these tradeoffs because the data may be laid out inside main memory without suitable caches.

In some embodiments different "islands" in memory may contain function-in-memory circuits with different capabilities, and a scheduler may cause different computing tasks to be delegated, by a host processing circuit connected to the islands, to respective islands depending on the nature of the computing tasks and on the capabilities of the function-in-memory circuits in each island. As used herein, a "computing task" is any collection of operations to be performed by a computer; as such, a computing task may consist of, or include, a plurality of smaller computing tasks.

Figure 1A:
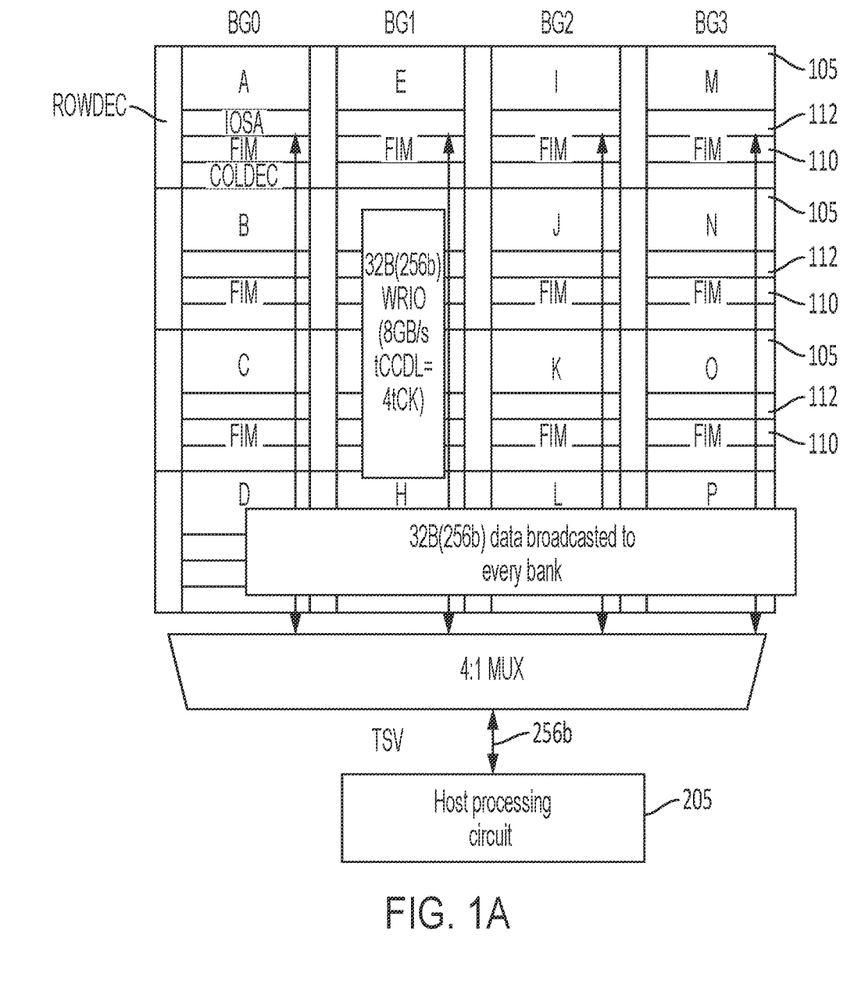
FIG. 1A shows a block diagram of a memory including a plurality of bank groups each including a plurality of banks, the memory further including a plurality of function-in-memory circuits, according to an embodiment of the present disclosure.

Referring to FIG. 1A, in some embodiments, a memory (e.g., a high bandwidth memory (HBM) or dual in-line memory module (DIMM)) may be arranged as a plurality of bank groups (BG0, BG1, BG2, BG3) each including a plurality of banks 105 (with, e.g., BG0 including banks 105 labeled A, B, C, and D). Some features of FIG. 1A, such as through-silicon vias (TSV) are specific to HBM; other forms of memory (e.g., DIMM) may operate in an analogous manner, however. DRAM memory may be organized into ranks, chips, and banks 105. A "rank" may be a portion of the memory that has a shared chip-select pin. Each rank may include eight chips, and each chip may include 16 banks 105. The banks 105 of the chips may be organized into "megabanks", so that, for example, the set of banks 105 consisting of bank 0 from each of the eight chips in a rank may be megabank 0. The chips may be read in parallel, onto a 256-bit-wide bus, with each of the eight chips providing 32 bits of the 256 bits of data.

Figure 1B:
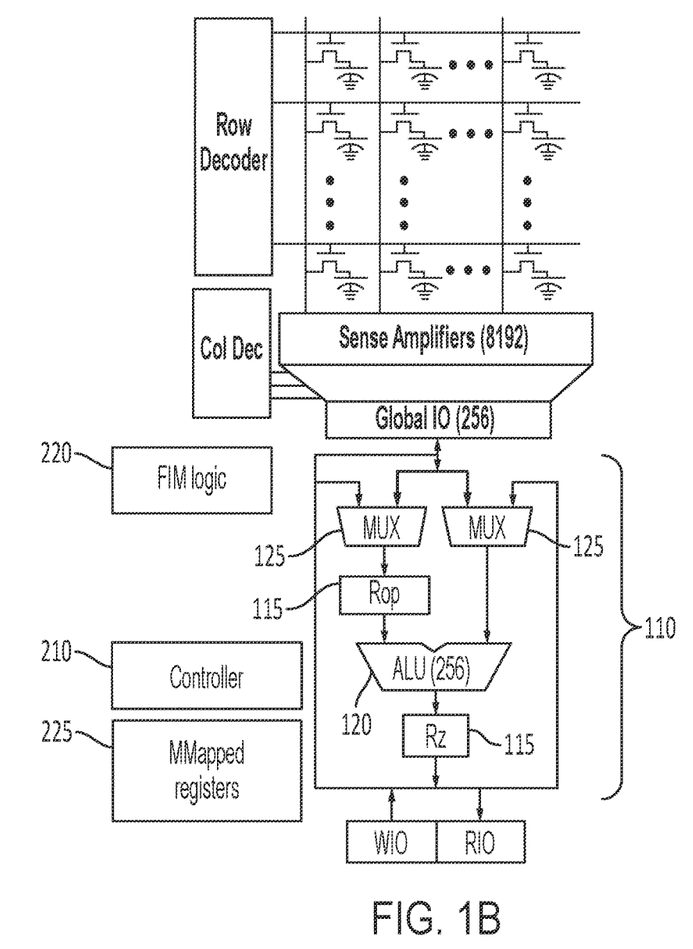
FIG. 1B shows a block diagram of a memory bank with plurality of sense amplifiers, a global input output register, and a function-in-memory circuit, according to an embodiment of the present disclosure.
Figure 1C:
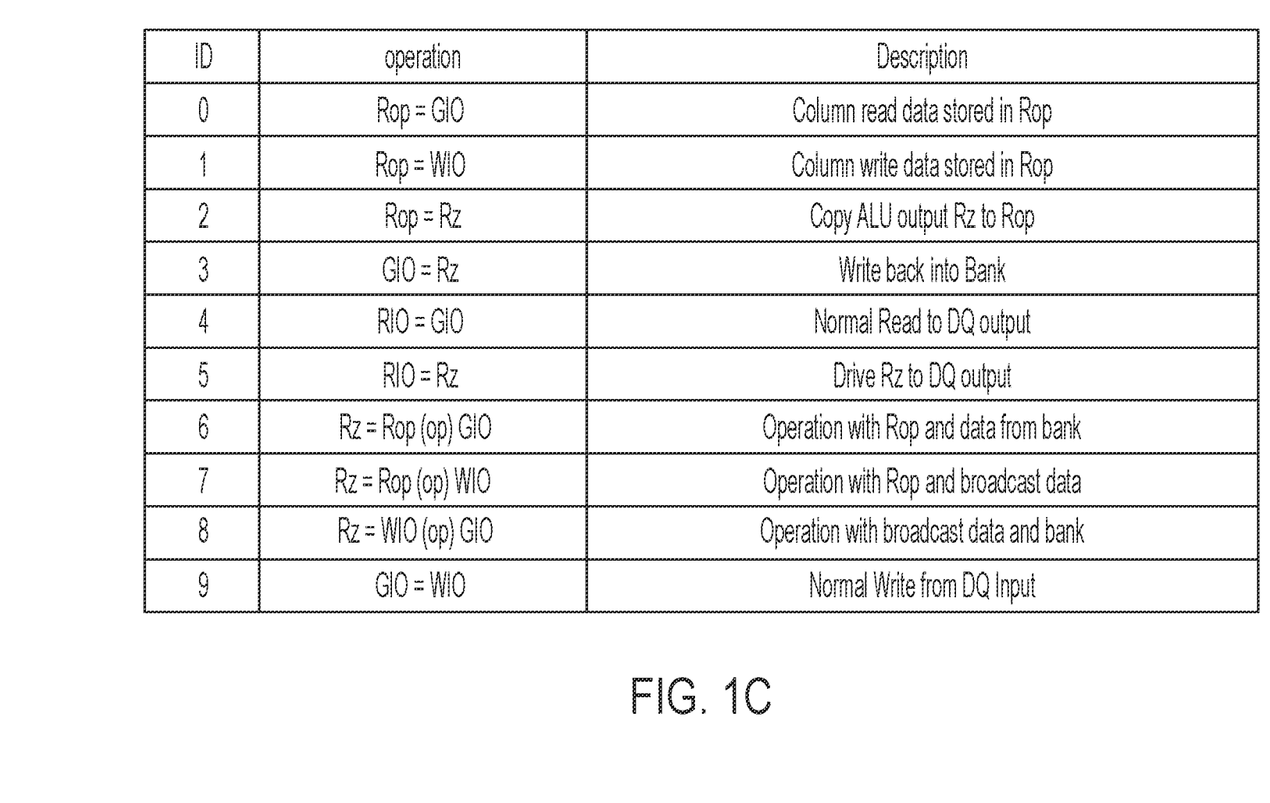
FIG. 1C shows a table of instructions for execution by a function-in-memory circuit, according to an embodiment of the present disclosure.

The memory may be connected to, and provide storage for, a host processing circuit 205 (e.g., a CPU or a GPU, or a CPU or a GPU with additional elements, such as a memory controller (MC)). In some embodiments, the host processing circuit 205 is on the host side of a network path (e.g., it is a host server). In an in-memory compute (IMC) system, each bank 105 may include an input/output sense amplifier 112 (IOSA), and a function-in-memory (FIM) circuit 110 (which may also be referred to as an "in-memory-compute circuit" or a "process in memory circuit"). As used herein, a function-in-memory circuit is a processing circuit that is capable of performing arithmetic operations or logical operations, and that is connected more directly to the memory than the host processing circuit 205 (and also more directly than an accelerator would be). As used herein, "more directly" means involving fewer intervening elements (for example, connected in a manner that does not involve the host-processor memory interface and the narrow bus that multiplexes data from multiple banks and ranks onto the same channel bus). For example, in a system in which memory is connected to the host processing circuit 205 by a DDR bus, a processing circuit on the memory side of the DDR bus may be considered a function-in-memory circuit, whereas a processing circuit (e.g., an accelerator on the host processing circuit side of the DDR bus, to which the host processing circuit 205 may delegate computing tasks) that is on the host processing circuit side of the DDR bus is not considered to be a function-in-memory circuit. FIG. 1B shows the structure of such a bank 105, in some embodiments, and FIG. 1C is a table showing a list of operations that may be performed by the function-in-memory circuit 110. In some embodiments, the host processing circuit 205 sends to the function-in-memory circuit 110 a number (e.g., a number between 0 and 9 corresponding to one of the rows of the table of FIG. 1C), and the function-in-memory circuit 110 then performs the corresponding operation. The instruction (or, equivalently, a number identifying the instruction) may be sent by the host processing circuit 205 to the function-in-memory circuit 110 through reserved-for-future-use (RFU) bits (e.g., RFU bits of a DDR interface).

As shown in FIG. 1B, the function-in-memory circuit 110 may include registers 115 (e.g., Rop and Rz), an arithmetic logic unit (ALU) 120, and multiplexers 125 (each labeled "MUX" in FIG. 1B), that together may be used to execute instructions (e.g., the instructions listed in the table of FIG. 1C). The function-in-memory circuit 110 may further include FIM logic 220, a controller 210, and memory-mapped registers 225 (discussed in further detail below). As shown in the table of FIG. 1C, the instructions may cause the function-in-memory circuit 110 to copy the contents of one register into another (e.g., instructions 0-5 and 9) or to perform an operation ("op") on the contents of two registers and to store the result in a third register (in the register Rz, in the case of the instruction set of the table of FIG. 1C). The operation may be an arithmetic operation (e.g., +, −, X, or /, performed, for example, according to IEEE-754), or a logical operation (e.g., bitwise & (AND), | (OR), ˆ (exclusive OR), or ~(ones complement)). A register (e.g., one of the memory mapped registers 225) may specify the operation (e.g., the particular arithmetic operation or logical operation) to be performed when the instruction is one of instructions 6, 7, and 8 in the table of FIG. 1C. Returning to FIG. 1B, the arithmetic logic unit 120 may include a 16-lane, 16-bit floating point (FP-16) vector unit or an 8-lane, 32-bit floating point (FP-32) vector unit, making possible various operations. Non-limiting examples can include tensor operations (e.g., dot product, outer product, ReLU (rectifier, or rectifier linear unit), vsSqr (squaring the elements of a vector), and vsSQrt (taking the square root of each element of a vector)). For efficient use of the function-in-memory circuit 110, the data may be arranged in the memory so that multiple operands are concurrently available in the open row. As used herein, the "open row" refers to the data in the sense amplifiers 112 (after row activate is issued). The open row may, for example, include 8192 bits of data, from which the ALU may be able to read multiple operands (e.g., 32-bit operands).

Figure 2A:
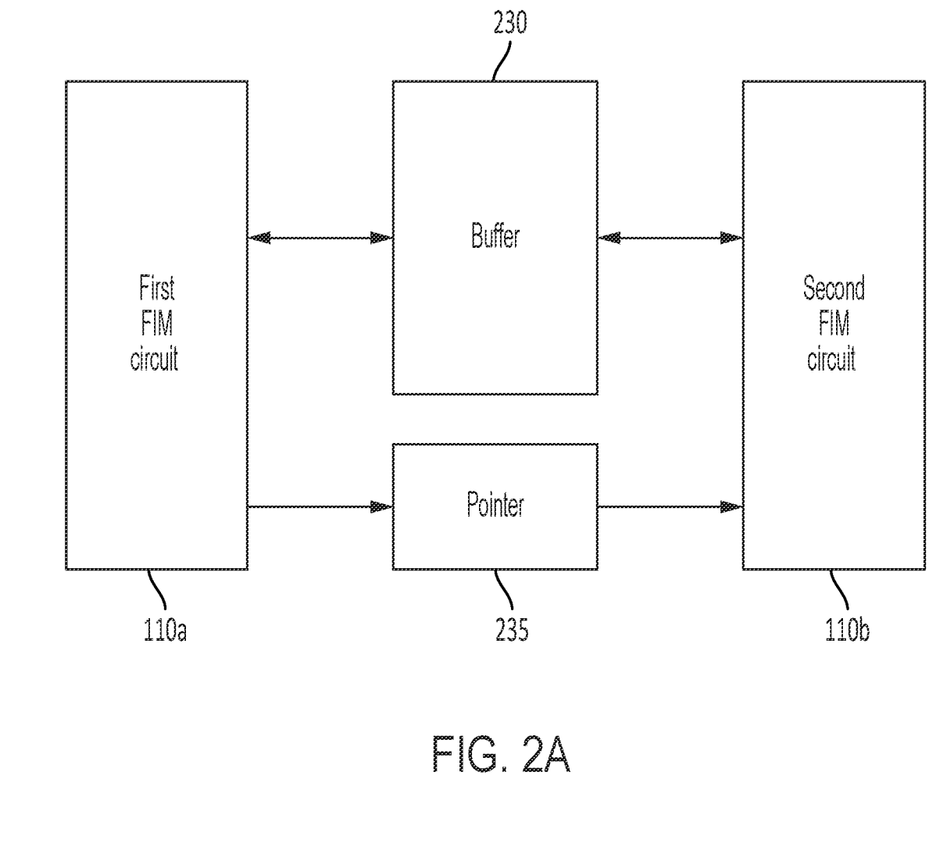
FIG. 2A shows a block diagram of two function-in-memory circuits in a producer-consumer configuration, according to an embodiment of the present disclosure.

As mentioned above, in some embodiments, the efficiency with which function-in-memory circuits 110 perform computations having multiple stages may be improved using a producer-consumer model. FIG. 2A shows a block diagram of a first function-in-memory circuit 110a and a second function-in-memory circuit 110b, in a producer-consumer configuration, in which both are connected to a buffer 230 and to a memory location or register storing a pointer 235.

Figure 2B:
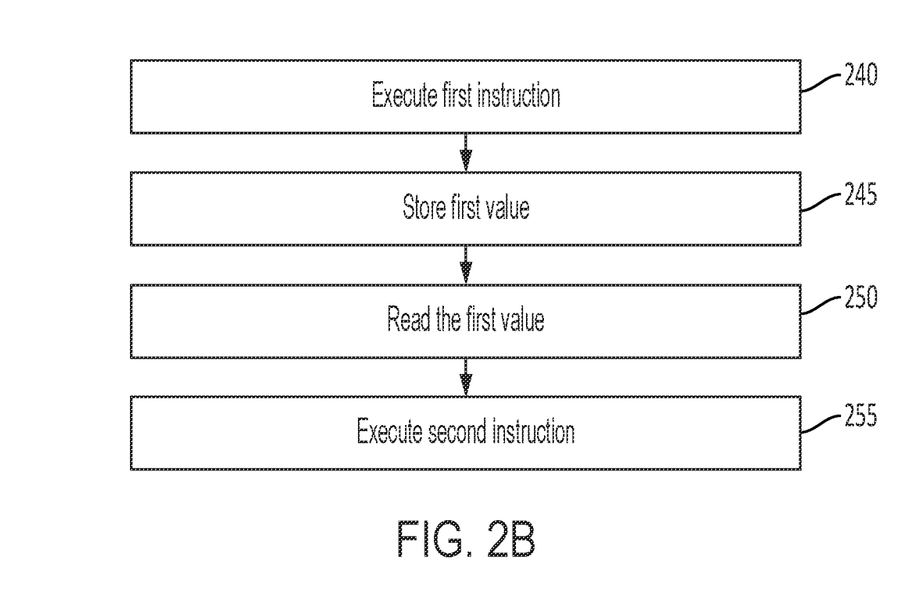
FIG. 2B shows a flow chart of producer-consumer operation, according to an embodiment of the present disclosure.

In one example, a first computing task includes a product of three matrices (a first matrix, a second matrix, and a third matrix). Calculating the product of the first matrix and the second matrix may be identified as a second computing task (included in the first computing task), and calculating the product of (i) the product of the first matrix and the second matrix (calculated by the second computing task) and (ii) the third matrix may be identified as a third computing task (also included in the first computing task). As shown in FIG. 2B, in this example the first function-in-memory circuit 110a (which may operate as the producer in this example) may, at 240, execute a first instruction, to produce, as a result, a first value. The first instruction may include (e.g., consist of) calculating the dot product of a row of the first matrix and a column of the second matrix, and the first value may be the value of the calculated dot product. The first function-in-memory circuit 110a may, at 245, store the first value in the buffer 230, in a first portion of the buffer used to store intermediate results (such as the product of the first matrix and the second matrix) generated by the first function-in-memory circuit 110a. A pointer 235 may identify the first portion of the buffer used to store such results (as discussed in further detail below).

Once the first value is available in the buffer 230, the second function-in-memory circuit 110b (which may operate as the consumer in this example) may, at 250, read the first value from the buffer 230 and may, at 255, execute a second instruction, using the first value as an argument. The second instruction may be part of the third computing task, and it may include, for example, forming a dot product of (i) a row of the product of the first matrix and the second matrix (which may include the first value) and (ii) a column of the third matrix. In this manner, as a result of the use of a producer-consumer model, it may be unnecessary for the second function-in-memory circuit 110b to wait for the entire second computing task (calculating the product of the first matrix and the second matrix) to be completed before beginning to perform the third computing task.

The first portion of the buffer 230 may, as mentioned above, store intermediate results for use by the second function-in-memory circuit 110b. A boundary of the first portion of the buffer 230 may be identified by a pointer 235 that points into the buffer 230. The first portion of the buffer 230 may be used to store intermediate values. The boundaries of the first portion of the are defined by pointers (with one of the boundaries being defined by the pointer 235). This helps to use locks (or other synchronization) on that region, and to ensure that only the producer can write to that region (and in fact ensure that the consumer can only process) after the producer releases the lock. After storing the first value in the buffer 230, the first function-in-memory circuit 110a may adjust the pointer 235, so that, after the adjusting of the pointer 235, the first value (which, before the adjusting of the pointer 235, was not in the first portion of the buffer 230) is in the first portion of the buffer 230. The adjusting of the pointer may indicate, to the second function-in-memory circuit 110b that the first value is an intermediate result ready to be used by the second function-in-memory circuit 110b. As such, the mode of operation of the second function-in-memory circuit 110b may be (i) to perform calculations using data in the first portion of the buffer 230 that it has not yet used, or, (ii) if there are no such data, to wait until more data become available in the first portion of the buffer 230 (e.g., when the boundary of the first portion of the buffer 230 is moved as a result of the pointer 235 being adjusted). As used herein, a "boundary" of a portion or region of memory is (i) the largest address in the portion or region of memory, or (ii) the smallest address in the portion or region of memory. As such, each portion or region of memory has two boundaries.

The buffer and the pointer may be directly accessible to the first function-in-memory circuit 110a and to the second function-in-memory circuit 110b, in the sense that both may be able to directly read and write the buffer and the pointer without participation by the host processing circuit 205. As used herein, "directly reading" memory by a function-in-memory circuit 110 means reading the memory without participation by the host processing circuit 205 and "directly writing" memory by a function-in-memory circuit 110 means reading the memory without participation by the host processing circuit 205.

In another example of the use of a producer-consumer model, a neural network inference calculation may involve calculating activations of a first layer of the neural network and multiplying the activations by weights in a subsequent layer of the neural network; in such a circumstance the producer function-in-memory circuits may calculate the activation functions, and the consumer function-in-memory circuits may multiply each activation, when it has been generated, by one or more weights. The calculating of an activation function may involve evaluating a sigmoid function, a rectifier linear unit (ReLU) function, or a hyperbolic tangent function, or any other suitable function.

As mentioned above, in some embodiments, a memory connected to the host may include one or more "islands" of memory. Each such islands may be a quantity of memory. As used herein, a "quantity of memory" is any set of memory cells at a contiguous range of physical addresses. Each island may include function-in-memory circuits 110 with different capabilities. For example, a first island may include a plurality of function-in-memory circuits 110 each configured to perform the calculation of a gated recurrent unit, which may include calculating two sigmoid functions and a hyperbolic tangent. A second island may, for example, include a plurality of function-in-memory circuits 110 each having an arithmetic logic unit 120 configured to perform a matrix multiplication. The host processing circuit 205 may delegate different computing tasks to different islands depending on the nature of each of the different computing tasks computing task and the respective capabilities of the function-in-memory circuit 110 in the different islands. In this way, the system may be "adaptable" or "adjustable" in its ability to adjust, or adapt, to different computing tasks.

The islands may be substantially isolated from each other. As used herein, a first quantity of memory including function-in-memory circuits 110 is "substantially isolated" from a second quantity of memory including function-in-memory circuits 110 if (i) the function-in-memory circuits 110 of the first quantity of memory are not able to read or write the memory cells of the second quantity of memory without the participation of the host processing circuit 205, and (ii) the function-in-memory circuits 110 of the second quantity of memory are not able to read or write the memory cells of the first quantity of memory without the participation of the host processing circuit 205.

Figure 3A:
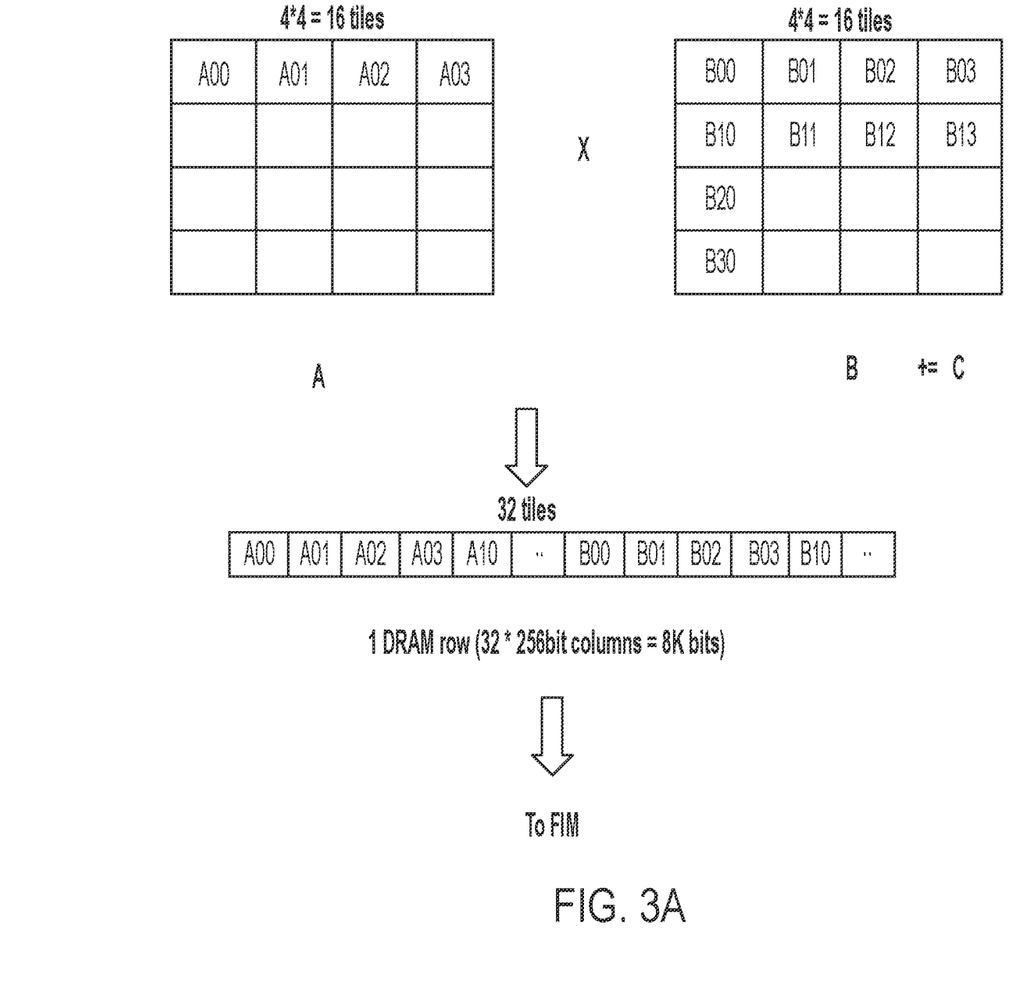
FIG. 3A shows a general data layout diagram for operations involving portions of two matrices, according to an embodiment of the present disclosure.

In some embodiments, the function-in-memory circuits 110 in different islands may differ in the order in which they use data from an open cell to perform (i) vector operations (which may be part of matrix operations) or (ii) matrix operations. FIGS. 3A-3E show several ways in which vector or matrix operations may be performed. Referring to FIG. 3A, to form a matrix product of two matrices, a first matrix and a second matrix, (the result of which may be added to the contents of a third matrix) a portion A of the first matrix may be stored in a first set of 16 tiles, and a portion B of the second matrix may be stored in a second set of 16 tiles, as shown. The portions A and B may themselves be matrices. Each tile may include sixteen FP-16 (16-bit floating point) values. As such, each tile occupies 256 bits, and the 32 tiles shown may fill one 8192-bit row of DRAM. Each tile of the first row of A may be multiplied by all of the tiles of a corresponding column of B, e.g., A00 may be multiplied by each of B00, B01, B02, and B03, A01 may be multiplied by each of B10, B11, B12, and B13, and so forth. Similarly, A10 may be multiplied by each of B00, B01, B02, and B03. The open row may be read one column at a time, each column having 256 bits and corresponding to one of the tiles illustrated in FIG. 3A.

Figure 3B:
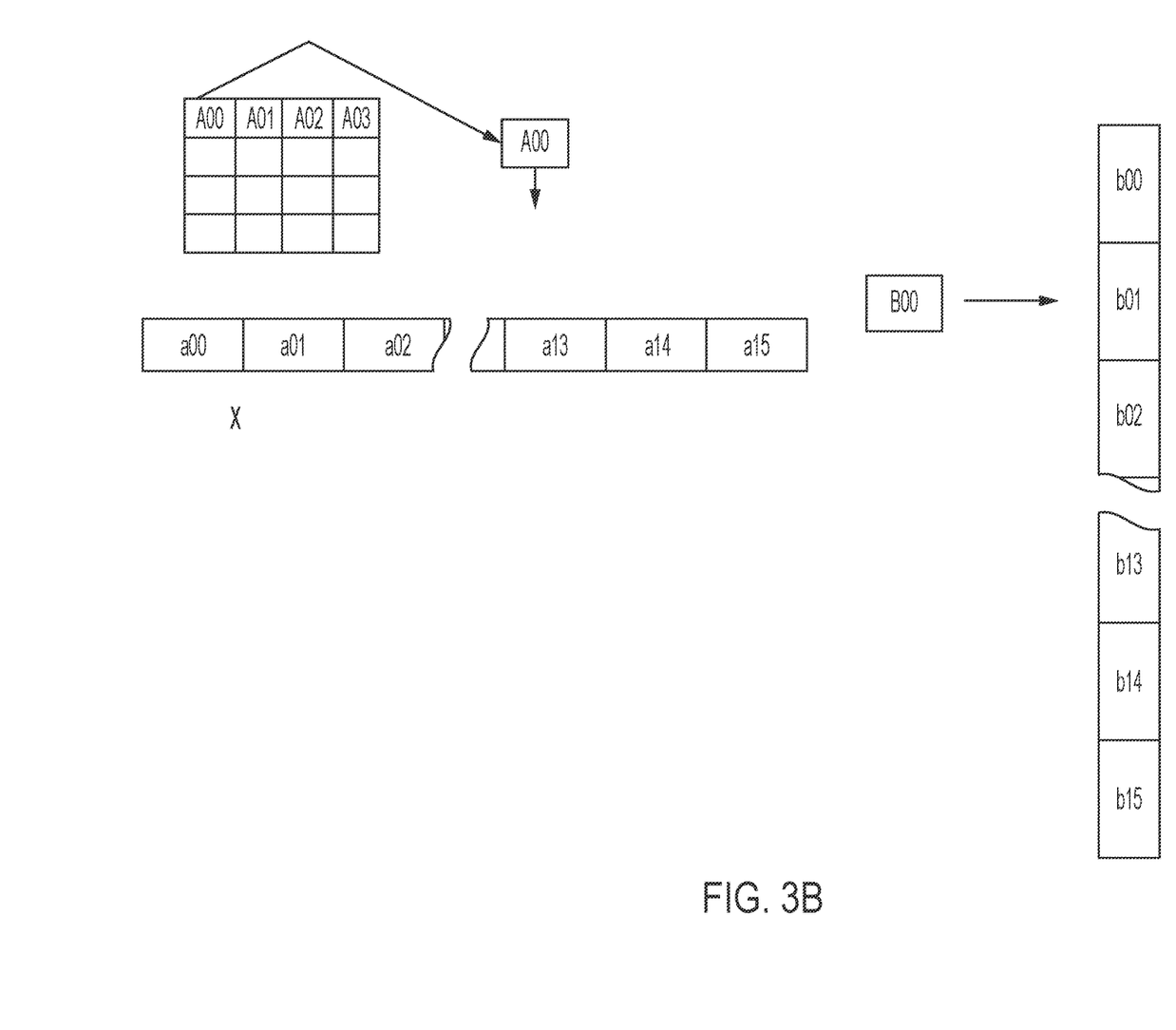
FIG. 3B shows a data layout diagram for a dot product operation involving portions of two matrices, according to an embodiment of the present disclosure.

FIG. 3B shows a data configuration that may be used to calculate a matrix product by forming dot products of rows of the matrix portion A with columns of the matrix portion B. In the example of FIG. 3B, the first tile A00 of the matrix portion A stores a row including elements a00, a01, and so forth, and the first tile B00 of the matrix portion B stores a column including elements b00, b01, b02, and so forth. In the terminology used herein, a lower case "a" or "b", followed by digits indicating its position in a vector, represents an element of a matrix (which may be an FP-16 number), and an upper case "A" or "B", followed by digits representing its position, represents a plurality of matrix elements (e.g., 16 matrix elements) stored in a tile. In operation, the row of A is read, from a first column of the open row, into a first register 115 (e.g., the Rop register) in the function-in-memory circuit 110. The column of B is then read, from a second column of the open row, into the arithmetic logic unit 120 together with the contents of the first register, and the arithmetic logic unit 120 calculates the dot product, and saves it in a second register of the function-in-memory circuit 110. This method for calculating a matrix product may have the advantage of requiring little space to store the intermediate products (i.e., the dot products, each of which is an element of the product matrix).

Figure 3C:
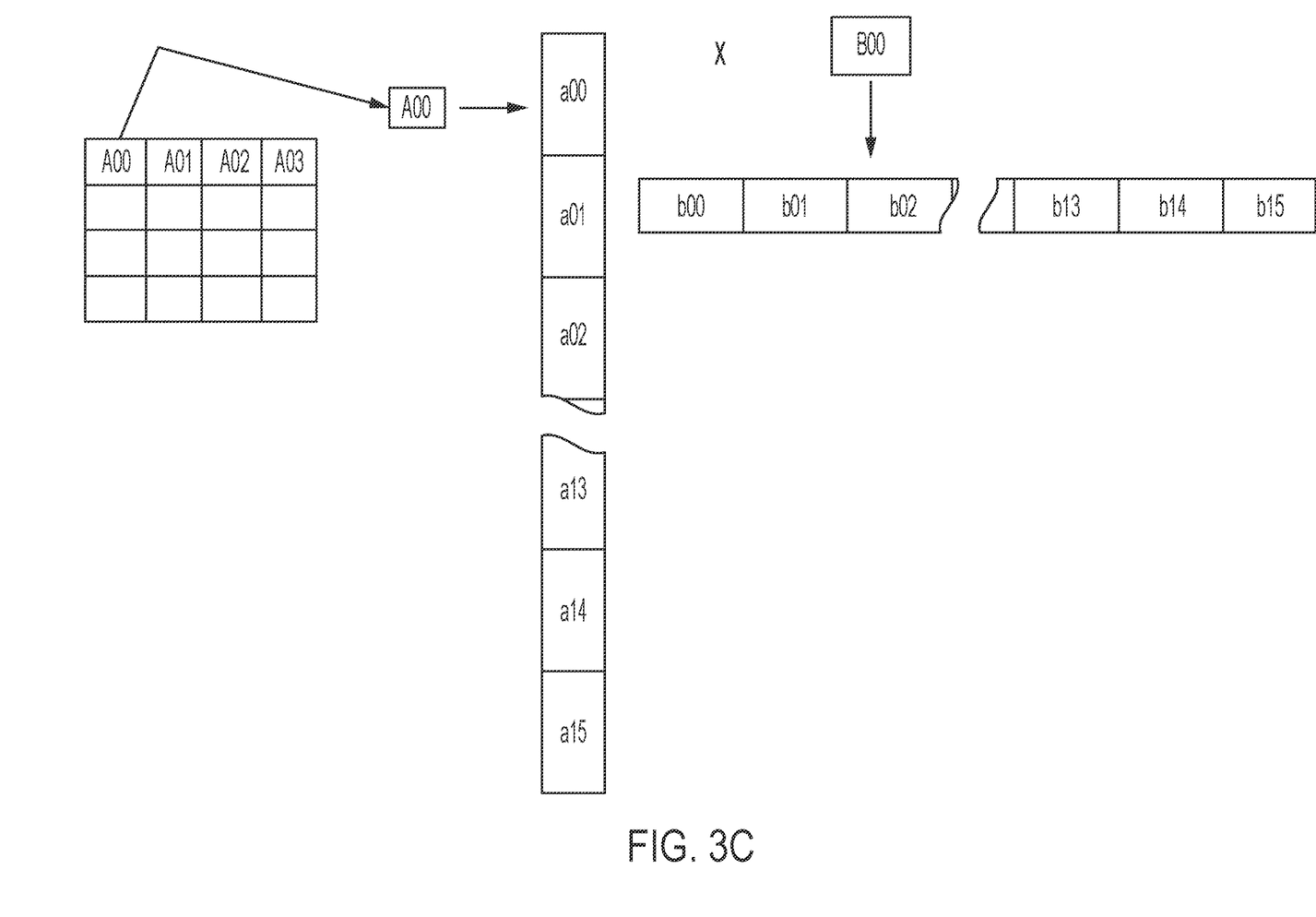
FIG. 3C shows a data layout diagram for an outer product operation involving portions of two matrices, according to an embodiment of the present disclosure.

FIG. 3C shows a data configuration that may be used to calculate a matrix product by forming outer products of columns of the matrix portion A with rows of the matrix portion B. In the example of FIG. 3C, the first tile A00 of the matrix portion A stores a column including elements a00, a01, and so forth, and the first tile B00 of the matrix portion B stores a row including elements b00, b01, b02, and so forth. In operation, the column of A is read, from a first column of the open row, into a first register 115 (e.g., the Rop register) in the function-in-memory circuit 110. The row of B is then read, from a second column of the open row, into the arithmetic logic unit 120 together with the contents of the first register, and the arithmetic logic unit 120 calculates the outer product, and saves it in a second register of the function-in-memory circuit 110. This method for calculating a matrix product may have the advantage of being suitable for implementation in simpler, faster hardware than the method of FIG. 3B (because an adder tree may not be used), at the expense of using a larger register (sufficiently large to store an outer product matrix) to store the intermediate products. Elements of a matrix product may be calculated by summing, for each element of the product array.

Figure 3D:
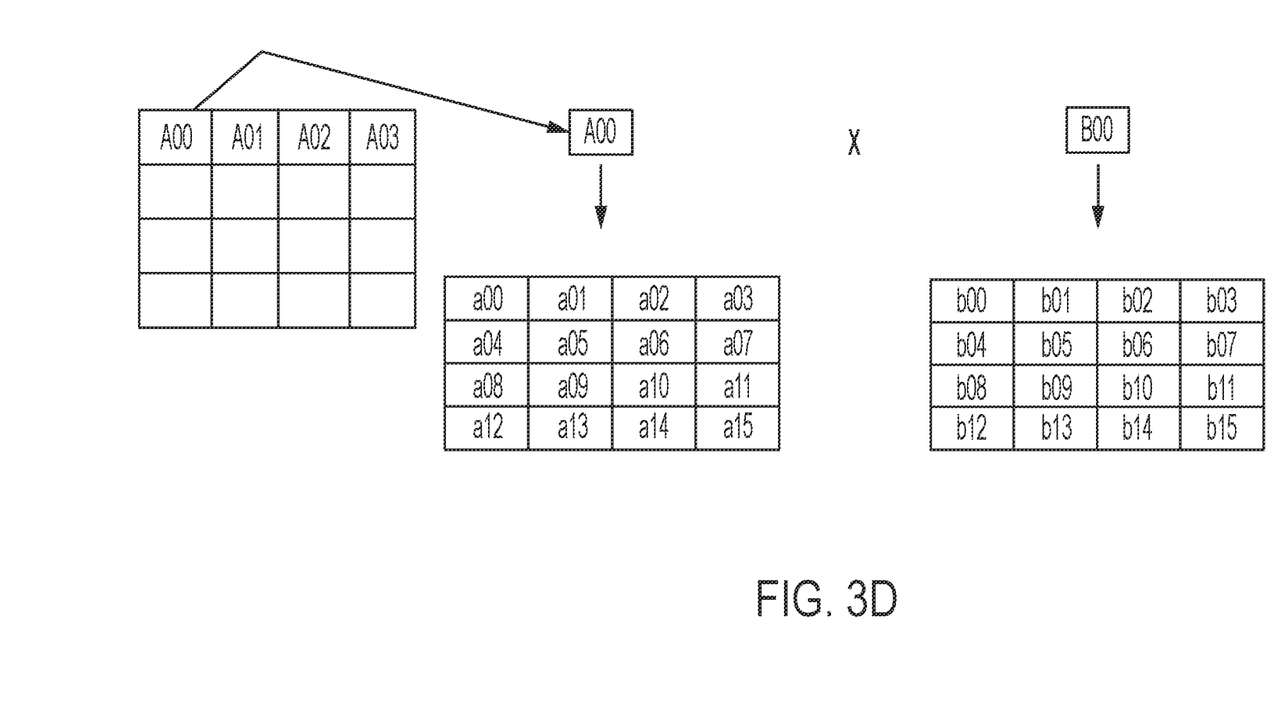
FIG. 3D shows a data layout diagram for a tensor product operation involving portions of two matrices, according to an embodiment of the present disclosure.

FIG. 3D shows a data configuration that may be used to calculate a matrix product by forming matrix (or "tensor") products of submatrices of the matrix portion A with submatrices of the matrix portion B. In the example of FIG. 3D, the first tile A00 of the matrix portion A stores a submatrix including elements a00, a01, and so forth, and the first tile B00 of the matrix portion B stores a submatrix including elements b00, b01, b02, and so forth. In operation, the submatrix of A is read, from a first column of the open row, into a first register 115 (e.g., the Rop register) in the function-in-memory circuit 110. The submatrix of B is then read, from a second column of the open row, into the arithmetic logic unit 120 together with the contents of the first register, and the arithmetic logic unit 120 calculates the matrix product of the submatrix of A and the submatrix of B, and saves it in a second register of the function-in-memory circuit 110. This method for calculating a matrix product may have the advantages of using smaller adder trees than the method of FIG. 3B, and of being capable (with a suitable arithmetic logic unit 120) of calculating products involving transposes without re-ordering the data in memory (e.g., the function-in-memory circuit 110 may be capable of calculating more than one of AB, $A^T B$ and $AB^T$ from one open row).

Figure 3E:
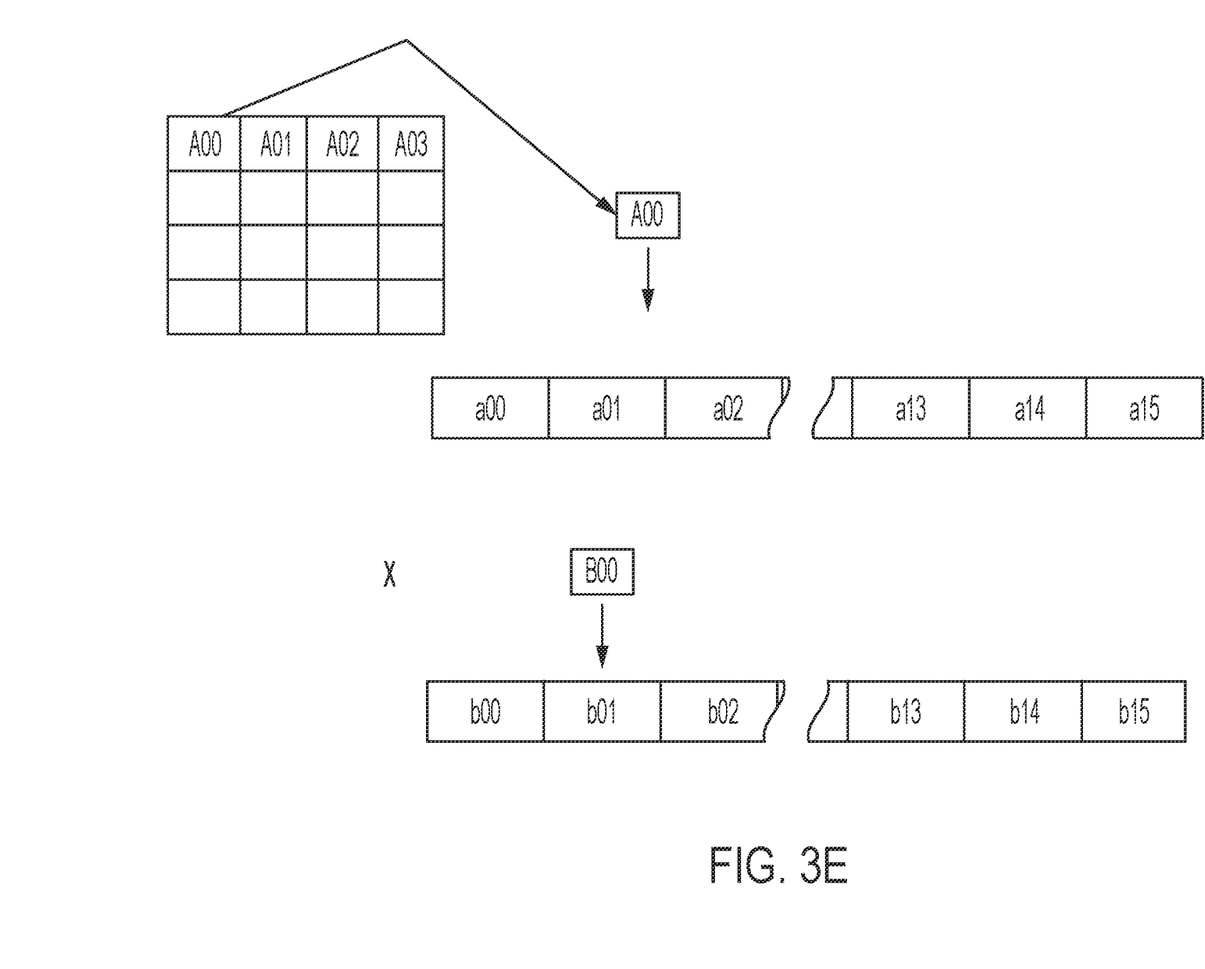
FIG. 3E shows a data layout diagram for an element-wise vector product operation involving portions of two matrices, according to an embodiment of the present disclosure.

FIG. 3E shows a data configuration that may be used to calculate an element-wise vector product of a row of the matrix portion A with a row of the matrix portion B (or, in an analogous manner, of a column of the matrix portion A with a column of the matrix portion B). Such a capability may be useful, for example, for calculating a convolution. In the example of FIG. 3E, the first tile A00 of the matrix portion A stores a row including elements a00, a01, and so forth, and the first tile B00 of the matrix portion B stores a row including elements b00, b01, b02, and so forth. In operation, the row of A is read, from a first column of the open row, into a first register 115 (e.g., the Rop register) in the function-in-memory circuit 110. The row of B is then read, from a second column of the open row, into the arithmetic logic unit 120 together with the contents of the first register, and the arithmetic logic unit 120 calculates the element-wise vector product, and saves it in a second register of the function-in-memory circuit 110.

In some embodiments, a scheduler may arrange the execution by the function-in-memory circuits 110, of various computing tasks to be executed, e.g., by instrumenting the code to be executed by the host processing circuit 205 so as to cause the host processing circuit 205 to program the function-in-memory circuits to execute certain computing tasks that are thereby delegated to the function-in-memory circuits.

Programming the function-in-memory circuits may entail writing, to the function-in-memory circuits, commands that cause the function-in-memory circuits to execute instructions or to perform read or write operations. The scheduler may be executed, by a processing circuit (e.g., by the host processing circuit 205, or by another processing circuit), at compile time (e.g., using static analysis of the source code or of the object code), or it may be executed (by a processing circuit) at run time.

The scheduler may analyze a framework graph (e.g., a Tensorflow™ graph) to allocate a number of FIM islands each with different characteristics (register sizes, clock rates, lanes etc.). The scheduler may further (i) maintain the occupancy of different islands (e.g., ensure that, to the greatest extent possible, all of the islands are performing calculations at all times, (ii) identify computing tasks that may be performed in parallel, and schedule them for execution by different islands, and (iii) use a producer-consumer model, as discussed above, to reduce idling of function-in-memory circuits while waiting for other computations to be completed.

The scheduler may also include an adaptive placement multiplexor, which may identify computing tasks suitable for delegation to the function-in-memory circuits, and use a cost function to analyze the benefit expected from delegating any computing task to each of various different types of island. For example, if a computing task includes one or more matrix multiplications, the adaptive placement multiplexor may evaluate the cost function for each of (i) the configuration of FIG. 3B, (ii) the configuration of FIG. 3C, and (iii) the configuration of FIG. 3D, and then delegate the computing task to an island containing function-in-memory circuits having the configuration for which the cost function is least.

In some embodiments, methods described herein may be used to perform convolutions, or calculations for a gated recurrent unit (GRU) or for a multilayer perceptron (MLP) or for scatter and gather operations.

As used herein, "a portion of" something means all, or less than all, of the thing. As such, for example "a portion of a matrix" means all or less than all of the matrix. As used herein, a vector (e.g., a row or a column of a matrix) is an example of a matrix (e.g., it is a 1×n matrix or an n×1 matrix). As used herein, the term "or" should be interpreted as "and/or", such that, for example, "A or B" means any one of "A" or "B" or "A and B"

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

Although exemplary embodiments of an adaptable function-in-memory system have been specifically described and illustrated herein, many modifications and variations will be apparent to those skilled in the art. Accordingly, it is to be understood that an adaptable function-in-memory system constructed according to principles of this disclosure may be embodied other than as specifically described herein. The invention is also defined in the following claims, and equivalents thereof.

What is claimed is:

1. A method for in-memory computing, the method comprising:
   selecting, by a processor connected to a memory, a first function-in-memory circuit of the memory to execute a first instruction comprising a first computing task;
   executing, by the first function-in-memory circuit, the first computing task on data stored in the memory; and
   determining, by the first function-in-memory circuit, a first value based on the executing the first computing task on the data stored in the memory,
   wherein the first function-in-memory circuit is selected based on one or more characteristics of the first function-in-memory circuit and one or more characteristics of the first computing task.

2. The method for in-memory computing of claim 1, wherein the one or more characteristics of the first function-in-memory circuit comprises one or more of register sizes, clock rates, and lanes.

3. The method for in-memory computing of claim 1, further comprises:
   executing, by a second function-in-memory circuit of the memory, a second instruction comprising a second computing task, based on the first value; and
   determining, by the second function-in-memory circuit, a second value, the second value being a result of the executing the second computing task.

4. The method for in-memory computing of claim 3, wherein the executing the second computing task further comprising:
   selecting, by the processor, a first buffer and the second function-in-memory circuit of the memory;
   storing, by the first function-in-memory circuit, the first value in the first buffer of the memory; and
   reading, by the second function-in-memory circuit of the memory, the first value from the first buffer,
   wherein the executing the second computing task is based on the reading the first value from the first buffer.

5. The method for in-memory computing of claim 4, wherein the first buffer is selected based on the one or more characteristics of the first computing task, and
   wherein the second function-in-memory circuit is selected based on one or more characteristics of the second function-in-memory circuit and one or more characteristics of the second computing task.

6. The method for in-memory computing of claim 3, wherein the executing the second instruction comprises using the first value as an argument.

7. The method for in-memory computing of claim 3, wherein the first function-in-memory circuit and the second function-in-memory circuit have different characteristics.

8. The method for in-memory computing of claim 1, wherein the first computing task comprises a second computing task and a third computing task, wherein the method further comprises:
   executing, by the first function-in-memory circuit, the second computing task to determine a second value; and
   executing, by a second function-in-memory circuit of the memory, the third computing task to determine a third value based on the second value.

9. A system for in-memory computing, the system comprising:
   a host processing circuit; and
   a memory connected to the host processing circuit, the host processing circuit being configured to program a first function-in-memory circuit of the memory, the programming causing the first function-in-memory circuit to:
      execute a first instruction comprising a first computing task on data stored in the memory; and
      determine a first value based on the executing the first computing task on the data stored in the memory.

10. The system for in-memory computing of claim 9, wherein the host processing circuit is further configured to:
    select, the first function-in-memory circuit of the memory to execute the first instruction comprising the first computing task,
    wherein the first function-in-memory circuit is selected based on one or more characteristics of the first function-in-memory circuit and one or more characteristics of the first computing task.

11. The system for in-memory computing of claim 9, wherein the host processing circuit is further configured to:
    select a second function-in-memory circuit of the memory based on one or more characteristics of the second function-in-memory circuit and one or more characteristics of a second computing task; and
    program the second function-in-memory circuit, the programming causing the second function-in-memory circuit to:

execute, a second instruction comprising the second computing task, based on the first value; and determine a second value, the second value being a result of the executing the second computing task.

12. The system for in-memory computing of claim 11, wherein the programming further causing the second function-in-memory circuit to execute the second instruction using the first value as an argument.

13. The system for in-memory computing of claim 11, wherein the host processing circuit is further configured to select a first buffer of the memory based on one or more characteristics of the first computing task, and wherein the programming further causing the first function-in-memory circuit to:
store the first value in the first buffer of the memory.

14. The system for in-memory computing of claim 13, wherein the programming further causing the second function-in-memory circuit to:

read the first value from the first buffer,
wherein the executing the second computing task is based on the reading the first value from the first buffer.

15. The system for in-memory computing of claim 9, wherein the first computing task comprises a second computing task and a third computing task, wherein the programming further causing the first function-in-memory circuit to execute the second computing task, to determine a second value; and execute the third computing task to determine a third value based on the second value.

16. A method comprising:

executing, by a first function-in-memory circuit of a memory, a first computing task;

determining, by the first function-in-memory circuit, a first value based on the executing the first computing task on data stored in the memory; and storing, by the first function-in-memory circuit, the first value in the memory, wherein the first function-in-memory circuit is selected by a processor connected to the memory to execute the first computing task based on one or more characteristics of the first function-in-memory circuit and one or more characteristics of the first computing task.

17. The method of claim 16, further comprises:

selecting, by the processor, a second function-in-memory circuit of the memory;

executing, by the second function-in-memory circuit of the memory, a second computing task, based on the first value; and determining, by the second function-in-memory circuit, a second value, the second value being a result of the executing the second computing task, wherein the second function-in-memory circuit is selected based on one or more characteristics of the second function-in-memory circuit and one or more characteristics of the second computing task.

18. The method of claim 17, wherein the executing the second computing task further comprising:

selecting, by the processor, a first buffer of the memory; and reading, by the second function-in-memory circuit of the memory, the first value from the first buffer, wherein the executing the second computing task is based on the reading the first value from the first buffer, and wherein the first buffer is selected based on the one or more characteristics of the first computing task.

19. The method of claim 17, wherein the executing the second computing task comprises using the first value as an argument, and wherein the first function-in-memory circuit and the second function-in-memory circuit have different characteristics.

20. The method of claim 16, wherein the first computing task comprises a second computing task and a third computing task, wherein the method further comprises:

executing, by the first function-in-memory circuit, the second computing task to determine a second value; and executing, by a second function-in-memory circuit of the memory, the third computing task to determine a third value based on the second value.

* * * * *